(12) United States Patent
Wasiewicz et al.

(10) Patent No.: US 8,605,840 B2
(45) Date of Patent: Dec. 10, 2013

(54) METHOD TO CANCEL IMPULSIVE INTERFERENCE FROM A SIGNAL PROCESSING SYSTEM

(75) Inventors: Richard Wasiewicz, Tully, NY (US); Thomas M. Parks, Hamilton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 251 days.

(21) Appl. No.: 13/151,681

(22) Filed: Jun. 2, 2011

(65) Prior Publication Data

US 2012/0307948 A1  Dec. 6, 2012

(51) Int. Cl.
 *H04B 1/10* (2006.01)
(52) U.S. Cl.
 USPC ........... 375/346; 375/350; 375/340; 375/316; 375/285; 327/311; 327/551; 327/552; 327/553

(58) Field of Classification Search
 USPC .......... 375/346, 350, 340, 316, 285; 327/311, 327/551, 552, 553
 See application file for complete search history.

(56) References Cited

U.S. PATENT DOCUMENTS

| | | | |
|---|---|---|---|
| 3,456,198 A | | 7/1969 | Black |
| 5,410,264 A | * | 4/1995 | Lechleider ..................... 327/311 |
| 5,852,630 A | * | 12/1998 | Langberg et al. ............. 375/219 |
| 6,529,568 B1 | | 3/2003 | Richards et al. |
| 6,546,057 B1 | * | 4/2003 | Yeap ............................. 375/285 |
| 6,920,194 B2 | * | 7/2005 | Stopler et al. ................. 375/349 |
| 7,593,494 B1 | * | 9/2009 | Ghobrial et al. ............. 375/350 |
| 7,630,448 B2 | * | 12/2009 | Zhidkov ........................ 375/260 |
| 7,809,076 B1 | * | 10/2010 | Ghobrial et al. ............. 375/285 |
| 8,213,525 B2 | * | 7/2012 | Caire et al. .................... 375/260 |
| 2006/0062184 A1 | | 3/2006 | Saarnisaari et al. |
| 2008/0089451 A1 | | 4/2008 | Taylor et al. |
| 2009/0216489 A1 | * | 8/2009 | Mahadevan et al. .......... 702/181 |
| 2010/0197233 A1 | | 8/2010 | Kim et al. |
| 2012/0087446 A1 | * | 4/2012 | Liu et al. ....................... 375/340 |

OTHER PUBLICATIONS

Abdelkefi, F et al. ; Impulse noise cancellation in multicarrier transmission; 2001 IEEE International Conference on Acoustics, Speech, and Signal Processing, 2001. Proceedings.; p. 2381-2384 vol. 4.
Yu, Xunyi et al.; OFDM Channel Estimation with Impulse Noise Cancellation; International Conference on Wireless Communications, Networking and Mobile Computing, 2007; WiCom 2007.; Oct. 8, 2007; p: 330-333; Shanghai.
Kerpez, KJ; Minimum mean squared error impulse noise estimation and cancellation; IEEE Transactions on Signal Processing; Jul. 1995; vol. 43 Issue:7; p: 1651-1662.
Zhang, D. et al.; Impulse Noise Detection and Removal Using Fuzzy Techniques; Electronics Letters; Feb. 27, 1997; vol. 33 Issue:5; p: 378-379.
Pelletier, MG; Adaptive signal processing for removal of impulse noise from yield monitor signals; http://hdl.handle.net/10113/12584 USDA, ARS; Journal of cotton science 2001. v. 5 (4), p. 224-233.
International Search Report dated Sep. 21, 2012, for International Application No. PCT/US 12/40532.

* cited by examiner

*Primary Examiner* — Sui Lee
(74) *Attorney, Agent, or Firm* — Howard IP Law Group, PC

(57) ABSTRACT

A method of canceling impulsive interference from a communications signal is provided. The method includes identifying an impulse interference contained in the communications signal, generating a model of impulse interference, matching the model in at least one of amplitude, phase and envelope time delay to the identified impulse interference, and cancelling the identified impulse interference by subtracting the matched model from the identified impulse interference.

15 Claims, 8 Drawing Sheets

METHOD TO CANCEL IMPULSIVE INTERFERENCE FROM A SIGNAL PROCESSING SYSTEM

FIELD OF THE INVENTION

The present invention relates signal processing, and more specifically to methods of decreasing interference from a received signal.

BACKGROUND

The ability to provide long-distance wireless communication in dangerous and/or obstructed environments, for example in underground mines, is essential for both efficient operation and safety. In some applications, such as coal mining, communications systems are required by regulations for post-accident communications. In these mining operations, transmitting communication signals through earth, water and/or rock, for example, in addition to the large amounts of steel and concrete used in associated structures, severely impacts the effective range of the communications signal. This is especially true with systems transmitting radio frequency signals through, for example, conventional electric dipole antennas.

Magnetic communications systems (MCSs) that provide low-frequency magnetic signals offer an increased ability to transmit through these materials. For example, a MCS may be used to provide emergency communication between a site deep within an underground mine and a second distant site, either on the surface or also within the mine. These systems typically operate with relatively weak signals and severe interference as a result of above-described impedances and interferences, both natural and manmade. This interference limits the ability of the MCS receiver to detect and demodulate the underlying signal, limiting the system's effective range as a result.

In the field of signal processing, conventional methods to reduce impulsive interference include median filtering applied to recorded impulse-contaminated data. However, this filtering tends to distort the signal in impulse-free regions, in addition to not adequately removing the impulses. Median filters may be more advantageously applied when impulses contaminate a single isolated sample. However, impulses occupy multiple consecutive samples, as they represent the net response of the antenna, receive channel, and digital demodulator to very short interference pulses impinging on the antenna.

Other methods, such as impulse excision followed by extrapolation, also produce unsatisfactory results as the desired communications signal is typically dominated by other superimposed noise signals in addition to the impulses. Thus, extrapolation operates primarily on noise and ignores the underlying signal.

Improved systems and methods to eliminate or reduce these interferences are desired.

SUMMARY

An embodiment of the present invention includes a method of canceling impulsive interference from a received signal, such as a communications signal. The method includes the steps of creating a model of the mean impulse response of the system and identifying impulse interference in a block of sampled signal data. The model is adjusted to fit the identified interference in amplitude, phase and envelope time delay. Finally, the adapted model is subtracted from the sampled data.

In another embodiment of the present invention, a signal processing system is provided. The system includes a transmitter configured to output a signal, such as a magnetic communications signal, and a receiver operative to receive the signal. A signal processor is provided for identifying an impulse interference contained in the underlying signal, generating and matching a complex impulse model to the identified impulse interference, and canceling the identified impulse interference by subtracting the complex impulse model from the identified impulse interference. Matching the model is accomplished in at least one of amplitude, phase and envelope time delay to the identified impulse interference.

DETAILED DESCRIPTION OF PREFERRED EMBODIMENTS

Figure 1:
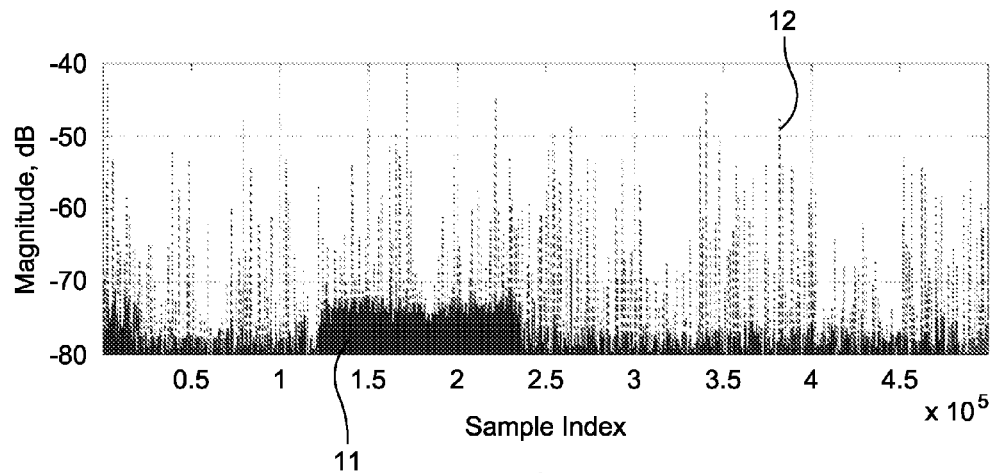
FIG. 1 is a graph showing an exemplary communications signal having impulsive interference.

It is to be understood that the figures and descriptions of the present invention have been simplified to illustrate elements that are relevant for a clear understanding of the present invention, while eliminating, for purposes of clarity, many other elements found in typical wireless communications systems, such as underground magnetic communications systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

The study of transmitted signals through, for example, MCSs have shown that, in some environments, a significant component of interference that falls within the communication system's passband consists of impulse-like waveforms. The amplitudes and timing of these impulses appear to be random, and thus unpredictable. More specifically, because these interferences are incident upon the receiving antenna of the system for such a brief period relative to the inverse of the receiver bandwidth, they tend to closely approximate the system's impulse response. For example, observed impulses may have nearly identical shapes but differ in time of occurrence, amplitude, and phase relative to the impulse envelope of the system's receive channel impulse response. This inherent shape represents the impulse response of the entire receive channel including, for example, the antenna, the receiver, and the complex bandpass digital filter applied to the real digital samples output by the receiver. While variations in the shape of the impulse interference have been observed, it is likely that these instances correspond to the overlapped channel responses resulting from two or more excitation impulses that are closer together in time than the inverse of the net receive channel's bandwidth.

Referring generally to FIG. 1, an exemplary communications signal 11 is shown having a relatively large magnitude of interference in the form of impulse-like waveforms 12. Embodiments of the present invention include a technique to identify these time-domain impulses and adaptively cancel them from, for example, a MCS receiver's complex digital output with minimal harm to the already relatively weak underlying communications signal 11.

Figure 2:
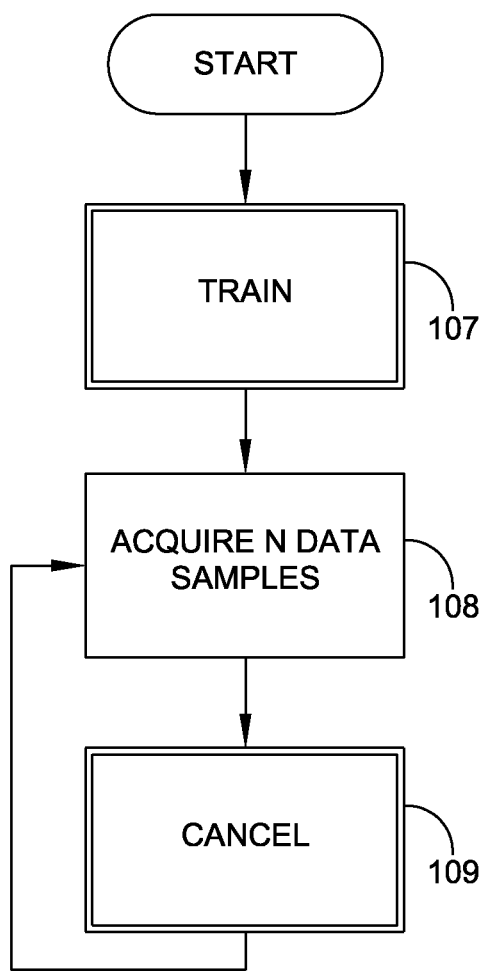
FIG. 2 is a process diagram illustrating the basic function of a cancellation method according to an embodiment of the present invention.

With reference to FIG. 2, methods to cancel this impulse interference from a signal include the use of a multi-step process, the first step 107 comprising a training process operative to develop a parametric model of a typical time-domain impulse. This model is adapted by adjusting its parameters to independently match each interfering impulse found in acquired data samples (step 108) by, for example, altering the model impulse according to a least mean square (LMS) fit to the impulse. In step 109 each impulse is canceled by subtracting the adjusted impulse model from the data. This cancellation process may be applied to sequential blocks of data. In one embodiment of the present invention, the cancellation process is performed on all received data, while the training process is performed less frequently.

Figure 3:
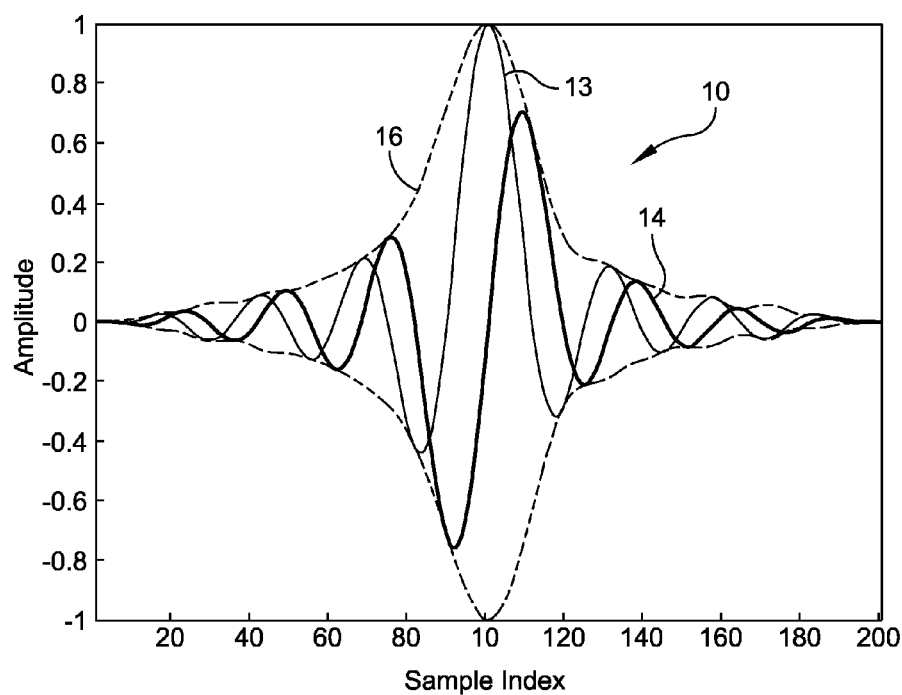
FIG. 3 is a graph of an exemplary model impulse response developed using the training process of FIG. 2.

Referring generally to FIG. 3, a representative impulse interference model 10 is shown. Model 10 may correspond generally to the impulse response of the receiver channel and comprises a real portion 13 and an imaginary portion 14 encompassed by an impulse envelope 16.

Figure 4:
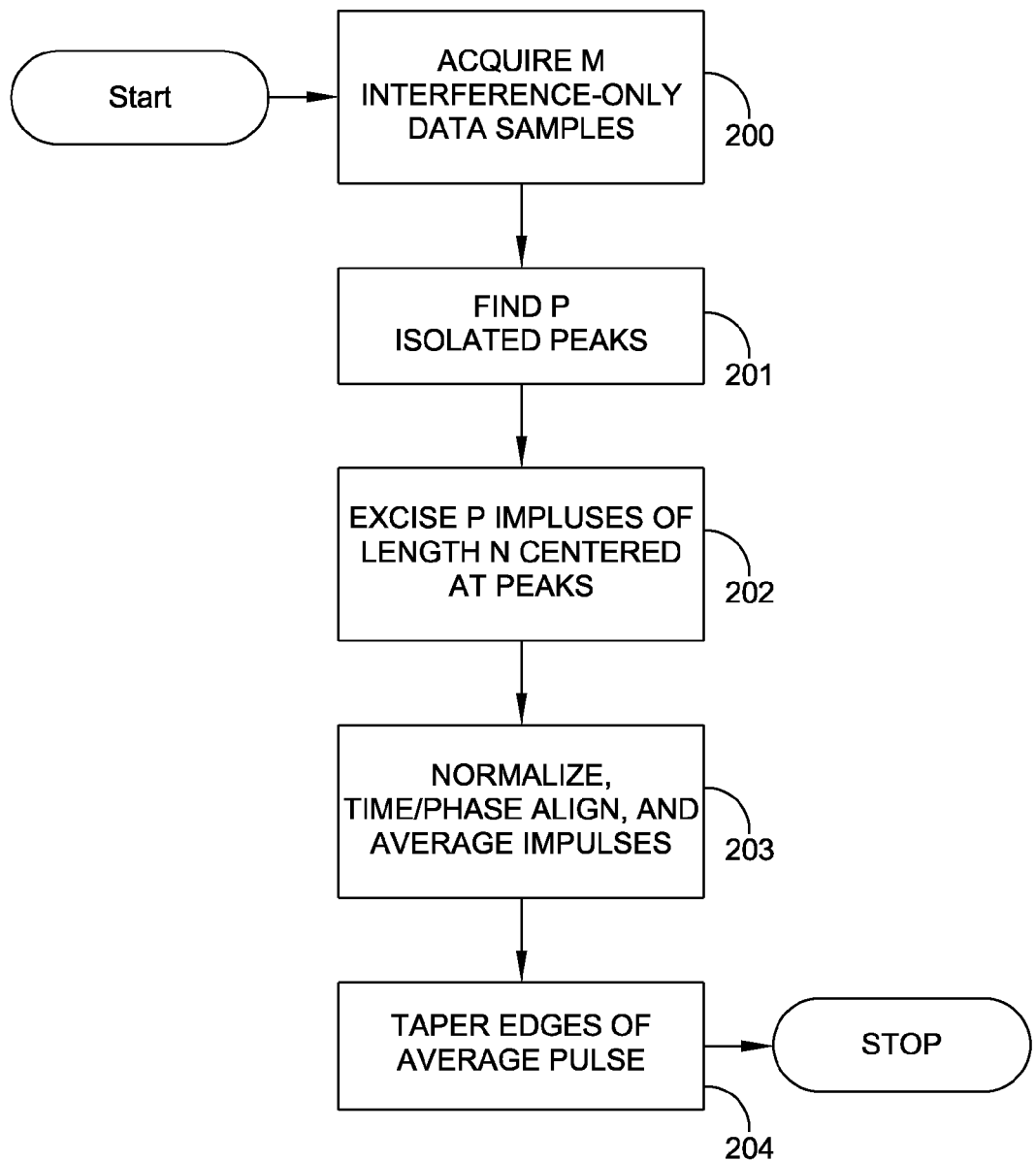
FIG. 4 is a process diagram illustrating the training process used to create the model impulse response of FIG. 3 according to an embodiment of the present invention.

As set forth above, and referring generally to FIG. 4, in one embodiment of the present invention, model 10 may be generated in a training process which includes sampling signal-free data containing at least one interference impulse. This may be achieved by examining a block of complex receiver output samples that is known to contain only interference. For example, in step 200, M data samples are acquired from a received signal. In one embodiment, this step includes isolating a given block $N_{IQ}$ of signal-free I/Q (amplitude and phase) data containing at least one interfering impulse (12, FIG. 1) from the data stream. In another embodiment, a data block may be chosen which comprises multiple interfering impulses.

In step 201, a number of impulses P, which may be predetermined, are identified from the sampled data block. The identification process may include detecting magnitude peaks and tagging each as impulsive interference if their magnitudes exceed an average background level by a predetermined threshold. During this process any impulses that appear to be overlapping with another impulse may be rejected (See also FIG. 8B). At step 202, the identified impulses of length N are excised from the data. This sampling operation may include capturing samples centered on the impulse's peak.

Identified impulses may be isolated and scaled in amplitude, aligned in phase, time limited, amplitude tapered to mitigate edge effects, and finally averaged to produce a complex impulse model, such as model 10 of FIG. 1, consisting of a real part 13 and an imaginary part 14. For example, in step 203, the impulse samples may be used to normalize and time align the impulses in order to generate a complex mean value. In the case of a data block having only a single sample, the mean value calculations will be unnecessary. In step 204, the edges of the calculated mean impulse may then be tapered such that the amplitude of envelope 16 (FIG. 3) smoothly drops to zero at its beginning and end. The resulting tapered, complex mean impulse may serve as the baseline impulse model. It is further envisioned that additional smoothing, and fitting operations may be applied to the model to further improve its accuracy.

Because the intrinsic impulse shape is generally invariant, the model impulse can be computed in non-real-time over a very long period (e.g. days or weeks). In this way, the model may be based on the analysis of a large number (e.g. thousands) of observed impulses as a result of the channel's impulse response being essentially time invariant. The model can be created, continually or periodically updated, and stored. Accordingly, it is envisioned that the model may be adjusted for specific operating conditions (e.g. mine conditions), both natural and manmade, that alter the impulse interference. In this way, each system would be adaptable for a given mine, changing conditions, and/or changes in communication system components, such as operating frequencies, proximity between components, and physical orientations of the transmitter(s) and/or receiver(s).

After impulse model 10 has been generated, it may be stored and applied to a received data communications signal to cancel out detected impulse interference in a number of ways. In one embodiment, the complex receiver data stream containing signal and interference may be monitored and each interfering impulse identified as it occurs using the same background thresholding technique described above with respect to step 201. When an impulse is identified, multiple time-delayed copies of impulse model 10 may be superimposed thereon, and the amplitude and phase of each copy adaptively adjusted to achieve the best match to the impulse. The best match may be determined by any number of suitable methods, such as an LMS approach. In one embodiment, for each subsequent $N_{IQ}$ block containing signal data (i.e. samples $N_{IQ+1}$ to $2N_{IQ}$, $2N_{IQ+1}$ to $3N_{IQ}$ . . . ), cancelling is achieved by performing the following operations using computed impulse model 10.

Figure 5:
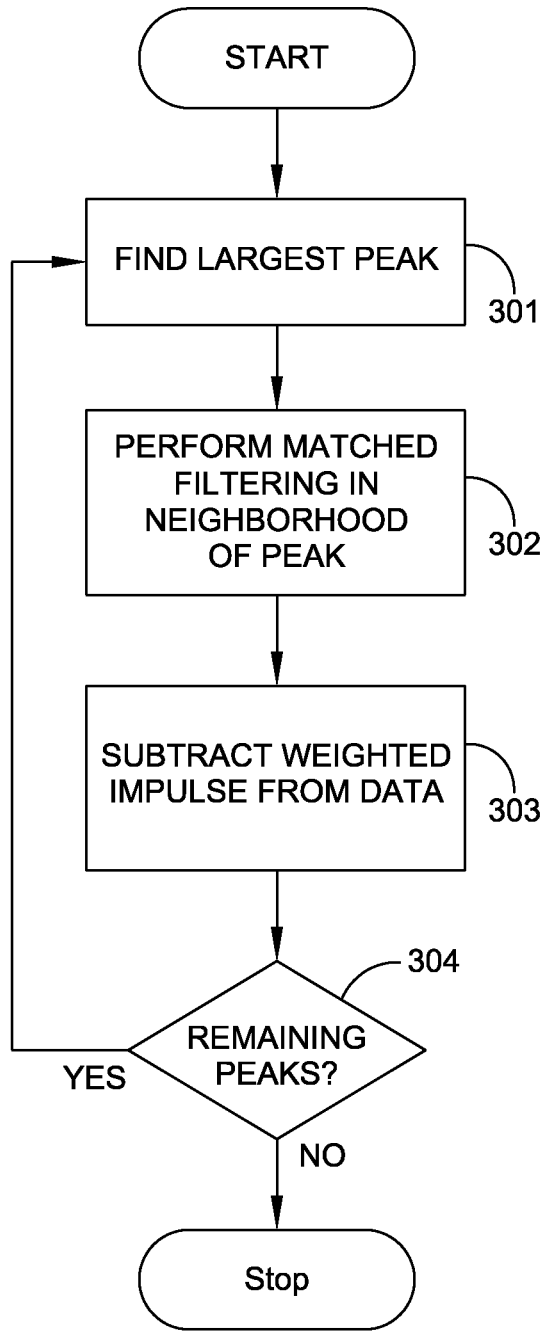
FIG. 5 is a process diagram illustrating the cancellation process of FIG. 2 according to an embodiment of the present invention.

Referring generally to FIG. 5, for a data block having multiple impulses, the impulse having the largest amplitude is identified in step 301. Once determined, a matched filtering process may be performed in step 302. This process may include acquiring samples, for example, $N_{SAMP}+M$ samples centered on the identified impulse where M is a pre-determined number of samples. The impulse model's first sample is then correlated, or overlaid, with the first sample of the $N_{SAMP}$+M extracted data samples. From the correlated first data sample, a first complex scaling factor may be computed that minimizes, for example, the mean square error between the scaled model and data sample.

In one embodiment, the process may be repeated, such that the impulse model may be successively shifted by one sample (i.e. from the first to the second sample) and correlated with the second sample of the detected impulse. A second scale factor and/or means square error may be generated and stored in the same manner as described with respect to the first correlated sample. This process may be repeated until the last sample of the model aligns with the last sample of the data window. In this way, the system will have calculated and stored scale factors for each of the correlated impulse model and impulse sample pairs.

Still referring to step 302, after each sample pair has been correlated, the results of the mean square error calculations for each sample may be compared, and the scale factor that resulted in the smallest mean square error (i.e. LMS) may be identified. This scale factor may be applied to impulse model 10. While the above described embodiments utilize a mean square error process for calculating the relative accuracy of a sample with the model, it is envisioned that any number of error detection methods may be used without departing from the scope of the present invention.

Finally, in step 303, the scaled impulse model may be correlated with, or overlaid onto, a detected impulse interference (e.g. the largest impulse interference identified in step 301) within a given data block and subtracted therefrom. This process can be repeated at step 304 any number of times for a given data block until no additional impulse interferences are detected. The model may be matched to all subsequent impulses in amplitude, time delay and phase, and subtracted. In this way, an embodiment of the present invention may operate sequentially, one impulse at a time, beginning with the largest, to enable cancellation of weaker impulses that may be overlapped with stronger impulses. After a predetermined number of operations, or after no additional impulse interferences are found, the above-described process may be repeated for subsequent data blocks by, for example, identifying the impulse having the largest magnitude in the next extracted data block.

Figure 6:
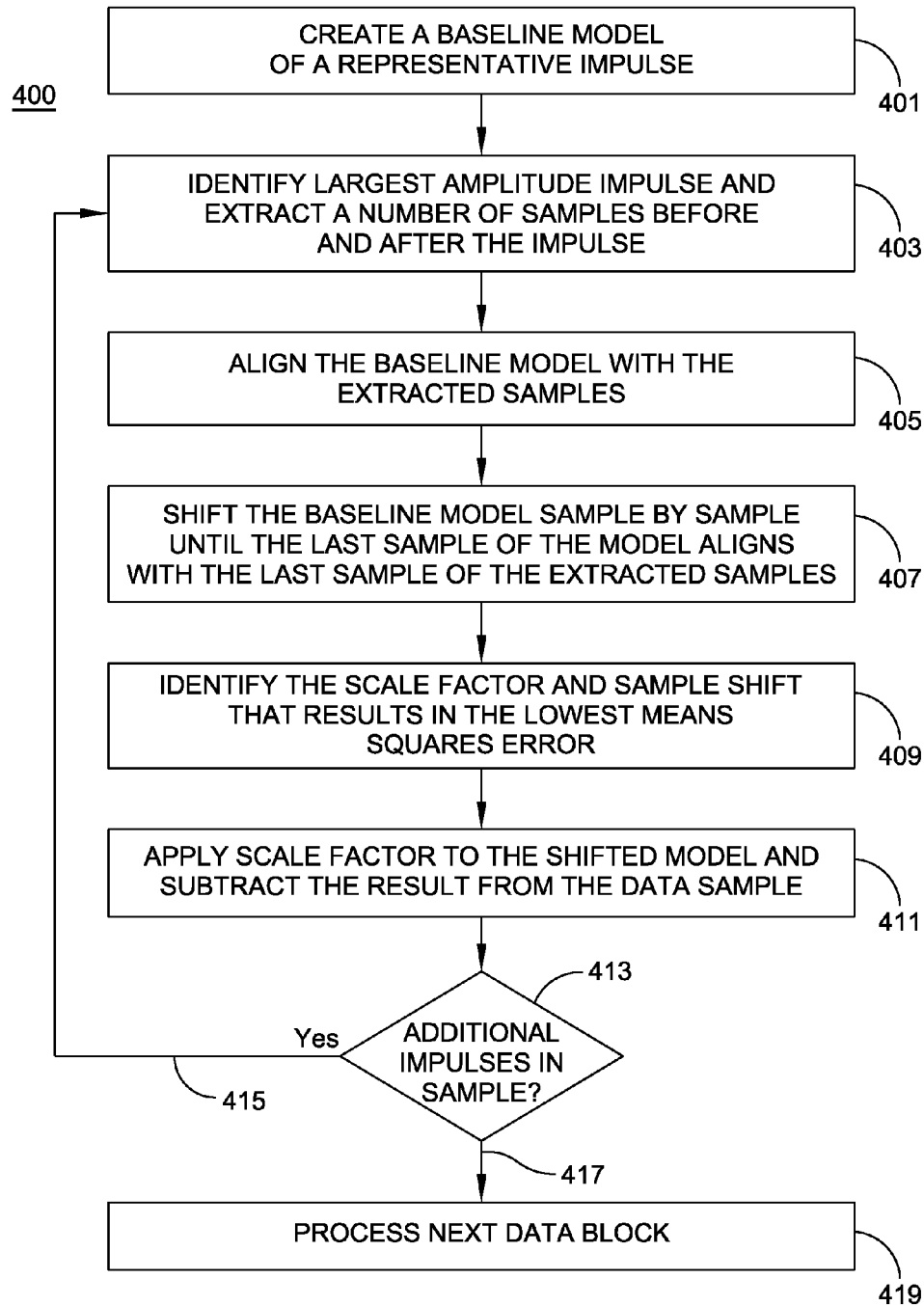
FIG. 6 is a process diagram illustrating an embodiment of a training and cancellation process of the present invention.

Referring generally to FIG. 6, a more detailed diagram illustrating an embodiment of the impulse interference cancellation method according to the present invention is provided. As described in detail with respect to FIG. 4 above, a baseline model of a representative impulse is created at step 401. Impulse interference received as part of a signal have a shape that is relatively invariant and is similar to the total system response of the receiver. Therefore, a baseline model may be created by isolating a signal free block of samples that contain multiple interfering impulses. After identifying isolated impulses within the sample, each impulse may be captured along with a number of neighboring samples centered on the impulse's peak sample. The impulses are normalized and time aligned to provide the complex mean of the impulses within the block of samples. The edges of the mean impulse may be tapered to provide an envelope that smoothly drops to zero and the first and last samples. The resultant complex mean impulse serves as the baseline impulse model.

The computed impulse model is then applied to a selected data block containing impulse interference. In step 403, for the selected data block the largest amplitude impulse is identified and a number of samples prior and subsequent to the impulse peak are extracted. The calculated baseline impulse model is aligned such that the first sample of the impulse model is aligned with the first sample of the extracted samples corresponding to the identified impulse in the current data block in step 405. Step 407 includes shifting the impulse model sample by sample until the last sample of the impulse model is aligned with the last sample of the extracted samples.

Once completed, a scaling factor and shift position is identified which results in the lowest least mean squares error in step 409. In step 411, the identified scale factor is then applied to the baseline impulse model and subtracted from the data block. In this way, the identified impulse is subtracted from the data block, accounting for the amplitude, time position and phase of the identified impulse interference. The impulse interference is removed from the received signal without compromising the desired signal embedded with the interfered received signal. After each identified impulse is subtracted, it is determined if any additional impulses exist in the current data block sample (step 413). For example, a peak amplitude that exceeds an average noise level by a predetermined threshold may be considered to be an impulse interferer. If additional impulses exist in the data at step 415, the process returns to step 403 and removes each subsequently identified impulse. If it is determined that no more impulses exist in the data block currently being examined (step 417), a next data block is selected and the process repeated thereon in step 419.

Figure 8A:
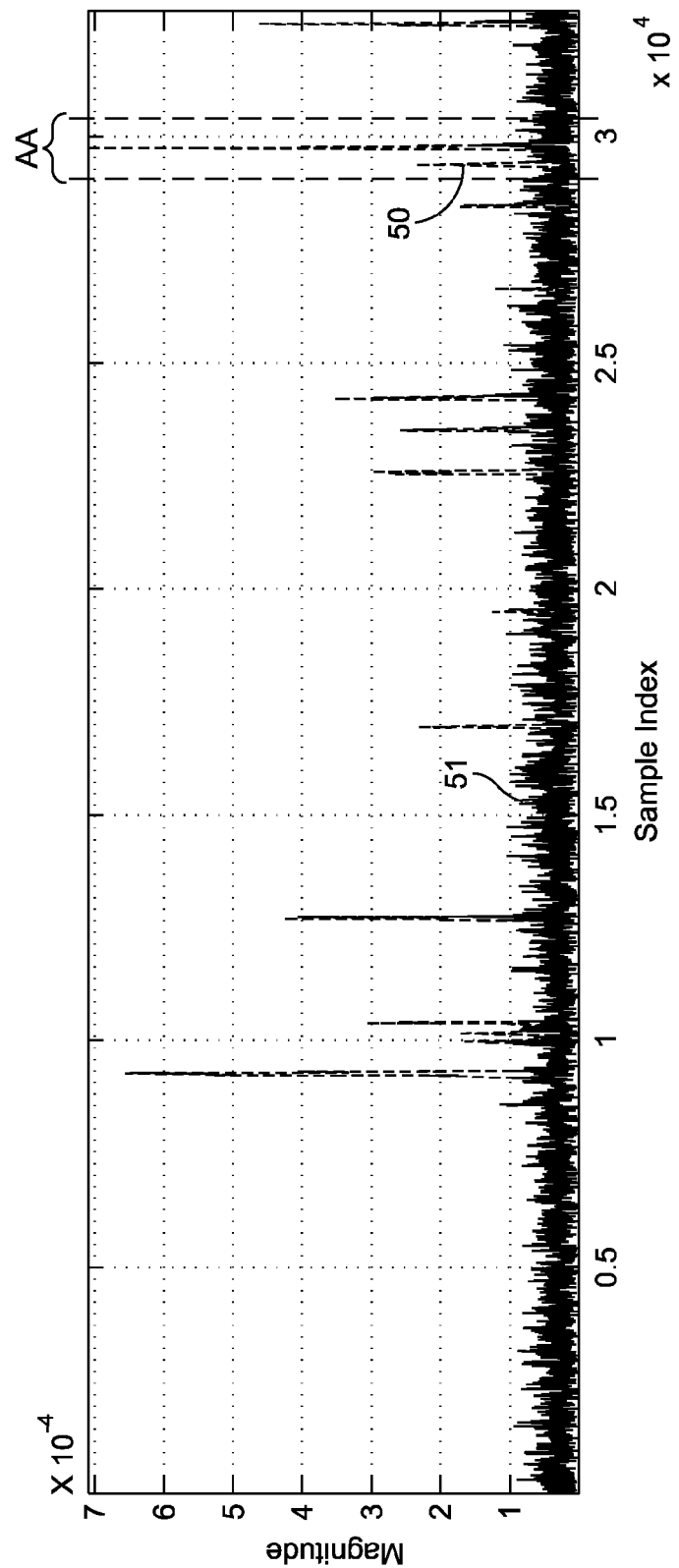
FIGS. 8A and 8B are time-domain graphs of an exemplary communications signal illustrating the results of the cancellation process of embodiments of the present invention.
Figure 8B:
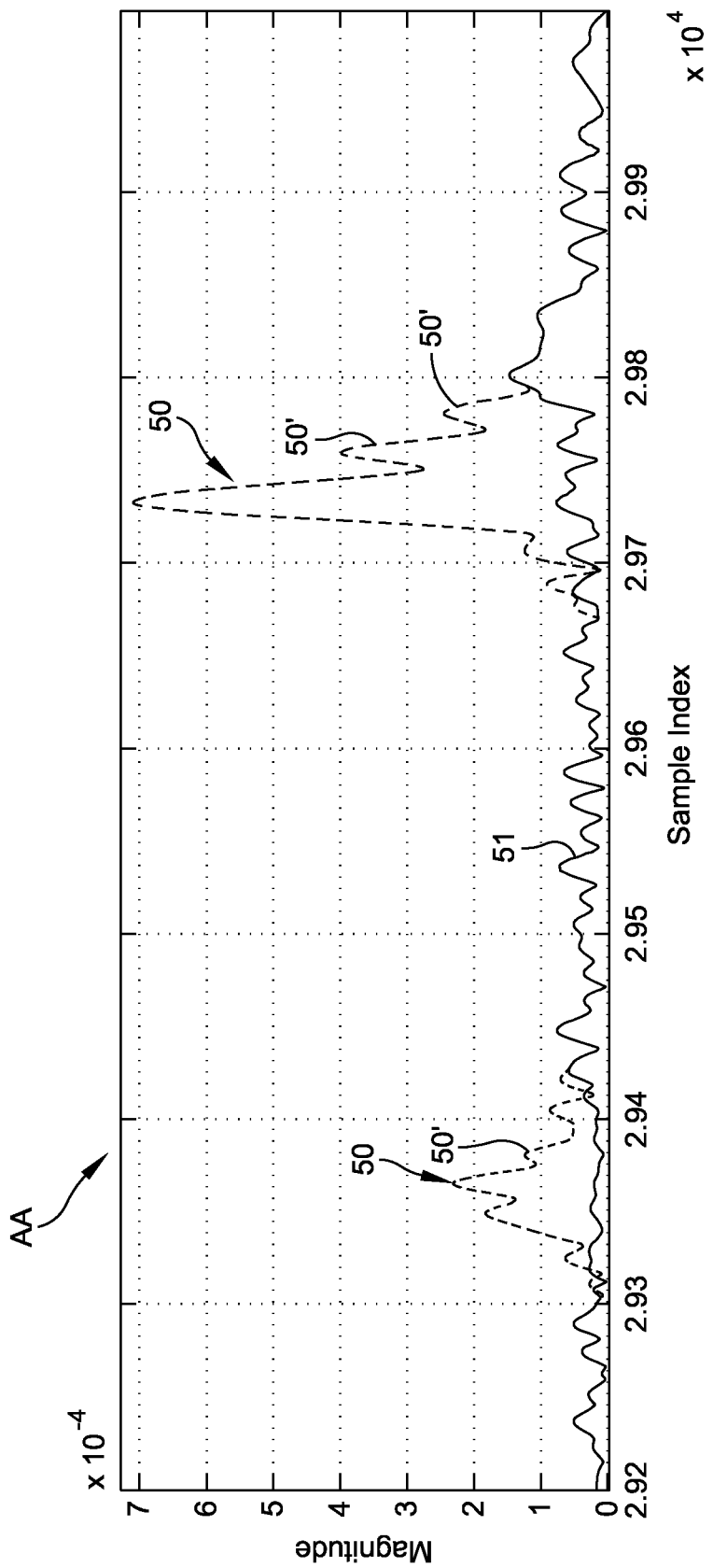

Exemplary results of the cancellation process according to embodiments of the present invention are shown in FIGS. 8A and 8B. FIG. 8A illustrates a data block of an exemplary signal containing numerous impulse-like interference peaks 50. FIG. 8B is a magnified view of section AA of FIG. 8A. As shown, impulse peaks 50 may be comprised of overlapped impulses 50'. Through the above-described iterative cancellation process, each of the overlapping impulses 50' are canceled from the signal, resulting in a generally impulse-free signal 51.

Figure 7:
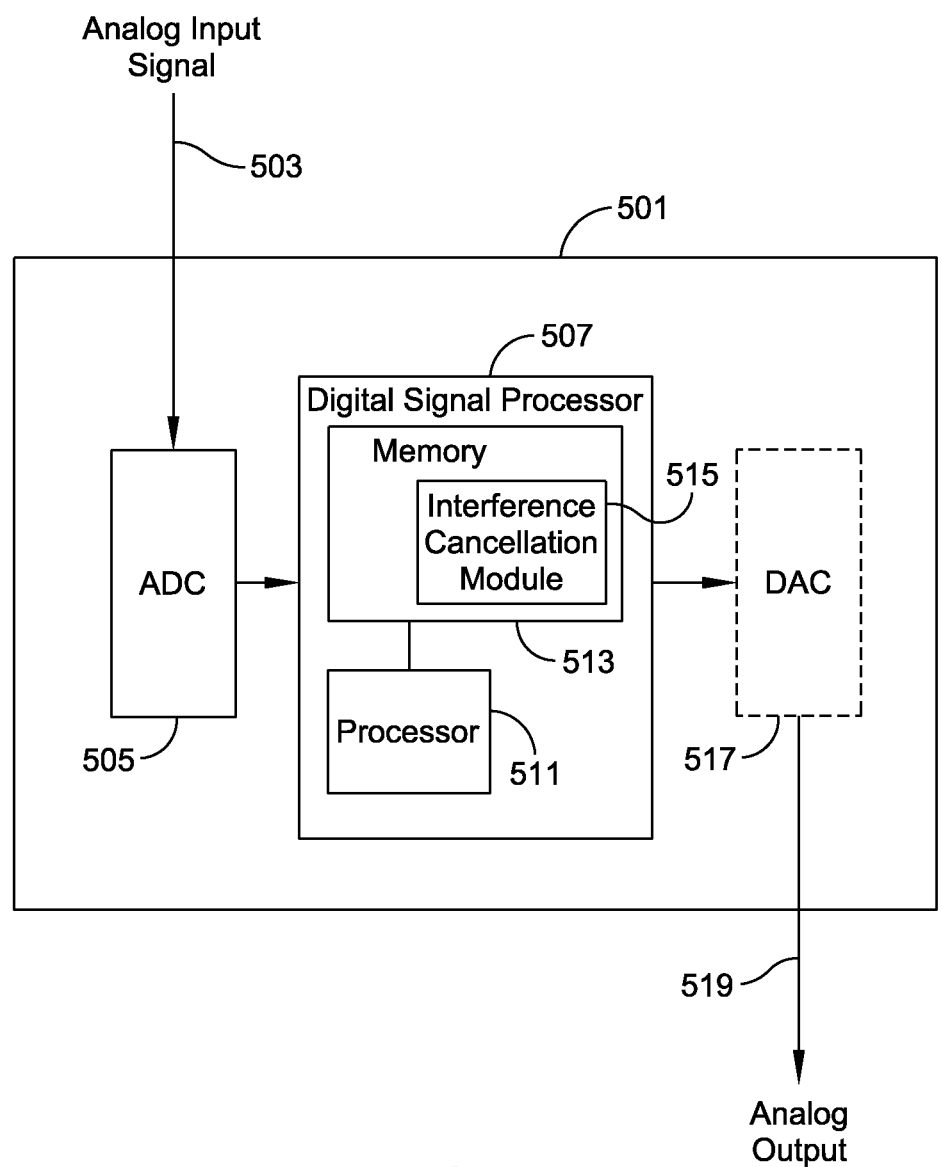
FIG. 7 is a block diagram of an exemplary signal processing system useful for performing the impulse cancellation process according to embodiments of the present invention.

FIG. 7 is a block diagram of a system 500 for signal processing utilizing an impulse interference cancellation process for adaptively removing impulse interference according to embodiments of the present invention. An analog input signal 503 is transmitted through one or more media from an originating source to one or more receivers 501. For example, the analog input signal 503 may be a communication signal, such as a signal used in a magnetic communications system, or analog input signal may be some other radio wave signal, such as a radio detection and ranging (RADAR) signal or a biomedical imaging signal. Input signal 503 may travel through one or more media from its point of origin to a receiver 501 receiving the input signal 503. Receiver 501 may include an appropriate antenna (not shown) through which the input signal 503 is received. By way of example, the input signal 503 may be a magnetic communication signal used for communications within an underground application such as a mine. The signal may pass through media such as rock, water, concrete, wood or air between its transmission source and a receiver 501. As the input signal 503 passes through the media, the signal strength may be affected through signal attenuation or diffusion which decreases the signal strength at the receiver 501. Other factors, both natural and manmade may contribute interference which further reduces the strength of the input signal 503 at the receiver 501. A substantial portion of these factors result in periodic or impulse interference signals having varying amplitudes and phases which combine and overlay the desired transmitted signal.

Receiver 501 includes an analog to digital converter (ADC) 505 which receives input analog signal 503 and samples the input signal 503 at various time intervals to provide a number of digitized samples representative of the signal level of the input signal 503 at the time the samples are taken. The digital samples are then input to a digital signal processor 507. The digital signal processor 507 may have a processor 511 operatively coupled to a memory 513 through an appropriate data bus. Stored within memory 513 is an Interference Cancellation Module 515, which according to an exemplary embodiment, provides adaptive cancellation of the impulse interference, overlaying the desired signal contained in the input signal 503. In one embodiment of the present invention, the digitally-processed signal may be passed from the digital signal processor 507 to a digital to analog converter (DAC) 517. The digitally processed signal includes the desired signal from analog input signal 503 with identified interference components that were received in the input signal 503 removed. The processed signal is converted by DAC 517 to an analog signal that corresponds to the input signal 503 with the interference components of the input signal 503 adaptively cancelled, preserving the desired signal. The processed analog signal is provided as an analog output signal 519 for downstream processing. For example, downstream processing may be a communications receiver for reproducing a received communications signal. In another embodiment, downstream processing may be a beam former used in a RADAR application for directing a receiver beam according to a received signal. In other embodiments of the present invention, downstream processing may be applied to the digital output of signal processor 507, rather than to an analog version of the output signal.

As shown and described with respect to FIG. 7, the Interference Cancellation Module 515 may be stored in memory 513 within signal processor 507. This illustration is provided by way of example only, and other embodiments for implementing the interference cancellation process described herein may be contemplated by one of skill in the pertinent art without departing from the intended scope of this disclosure. For example, the process has been explained by way of example, to include memory containing instructions, the instructions when executed by a processor, cause the steps of a method for cancelling impulse interference during signal processing to be performed. It is understood that the process of interference cancellation may also be performed in hardware, for example in a field programmable gate array (FPGA) or a complex programmable logic device (CPLD). Thus, the whole process or any part thereof, may be performed in hardware, software or any combination of hardware and/or software. Software may be embodied in a non-transitory machine readable medium upon which software instructions may be stored, the stored instructions when executed by a processor cause the processor to perform the steps of a method of cancelling impulse interference for signal processing. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

Embodiments of the present invention are adaptive and thus optimally cancel each impulse individually, even impulses overlapped in time. The embodiments minimize damage to the weak underlying MCS communications signal, unlike median filtering or impulse excision, which produce significant loss of portions of the underlying communications signal.

Embodiments of the present invention utilize a complex impulse model, rather than an impulse model based only on the real signal component. This complex model provides an additional degree of freedom (i.e. phase) relative to the impulse envelope, that enables a higher fidelity match to the data. Consequently, improved cancellation with less distortion of the underlying MCS communications signal may be realized.

In application, this time-domain impulse cancellation may be applied to the MCS receiver's demodulated output data stream prior to cancellation of other interferences, such as sinusoidal interference. This order may be preferred, as the net impulse spectrum can mask the presence of interfering sinusoids.

While the description of embodiments of the present invention are directed to a method of signal processing, it should be understood that embodiments of the present invention may include a corresponding MCS configured to perform these processes. The system may comprise, for example, at least one transmitter and at least one receiver, as well as the associated digital signal processing components adapted to perform the various steps described herein.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method of canceling impulsive interference from a signal to be processed, the method comprising the steps of:
   generating a complex model of an impulse interference by identifying a predetermined number of isolated impulse interferences in a block of sampled time-domain data and determining a mean impulse interference from the identified isolated impulse interferences;
   identifying an impulse interference contained in the signal;
   matching the model in amplitude, phase and envelope time delay to the identified impulse interference, and
   cancelling the identified impulse interference by subtracting the matched model from the signal.

2. The method of claim 1, wherein the step of determining the mean of the identified impulse interferences comprises normalizing and time-aligning the isolated impulse interferences.

3. The method of claim 2, further comprising a step of tapering edges of the mean impulse interference such that an amplitude of an envelope encompassing the mean impulse interference drops to zero at the first and last samples of the block of sampled time-domain data.

4. The method of claim 1, wherein the model impulse interference is computed over a plurality of observed impulse interferences.

5. The method of claim 1, wherein the step of identifying an impulse interference comprises identifying a plurality of impulse interferences in a block of sampled data.

6. The method of claim 5, further comprising the step of identifying the largest-amplitude impulse within the block of sampled data.

7. The method of claim 1, wherein the steps of matching the model to an identified impulse interference and cancelling the identified impulse interference are repeated until no additional impulse interferences are identified.

8. A method of canceling impulsive interference from a signal to be processed, the method comprising the steps of:
generating a complex model of an impulse interference;
identifying an impulse interference contained in the signal;
taking a predetermined number of samples centered on the identified impulse interference;
matching the model in amplitude, phase and envelope time delay to the identified impulse interference, and
cancelling the identified impulse interference by subtracting the matched model from the signal.

9. The method of claim 8, further comprising a step of aligning the model impulse interference with each of the predetermined number of samples and computing a complex scale factor that minimizes the difference between the model impulse interference and the predetermined number of samples.

10. The method of claim 9, further comprising a step of identifying a complex scale correction factor which corresponds to a least mean square error, and applying the identified complex scale factor to the model impulse interference.

11. A signal processing system for removing impulse interference from a signal to be processed, the system comprising:
an antenna for receiving an analog input signal;
an analog to digital converter (ADC) coupled to the antenna for generating digital samples of the analog input signal; and
a digital signal processor coupled to the ADC configured to process the digital samples and cancel impulse interference contained in the digital samples based on amplitude, position in time, and phase of the impulse interference, the digital signal processor comprising:
a processor for processing digital samples; and
a memory in communication with the processor, the memory comprising an interference cancellation module, the interference cancellation module comprising:
a first set of instructions, the instructions when executed by the processor causing the processor to compute an interference impulse model; and
a second set of instructions, the instructions when executed by the processor cause the processor to identify a plurality of impulses within a data block, match the interference impulse model to the identified impulses on the basis of amplitude, position in time, and phase of the identified impulses and subtract a scaled impulse model from the data block for each identified impulse.

12. The signal processing system of claim 11, the first set of instructions, when executed by the processor, further cause the processor to:
isolate a block of signal free complex samples containing at least one interference impulse;
identify a number of interference impulses and capturing a number of samples centered on the impulse's peak sample;
normalize the number of interference impulses to compute a complex mean of the interference impulses; and
apply a taper filter to the complex mean of the interference impulses to produce an impulse envelope wherein the envelope smoothly drops to zero at the first and last samples of the complex mean to provide a baseline impulse model.

13. The signal processing system of claim 11, the second set of instructions when executed by the processor, cause the processor to:
select a data block containing a predetermined number of samples of a received signal;
identify a largest amplitude impulse from the data block and extracting a number of digital samples before and after a peak sample of the largest amplitude impulse;
align the interference impulse model with the extracted samples and determine a scale factor and shift factor that produces a minimum least mean squares error;
apply the scale factor and shift factor to the interference impulse model and subtract the scaled model from the data block; and
repeat the selecting, identifying, aligning and applying steps for each subsequent data block in the received signal.

14. A non-transitory machine-readable medium upon which are stored instructions, the instructions when executed by a processor cause the processor to:
compute an interference impulse model by identifying a predetermined number of isolated impulse interferences in a block of sampled time-domain data and determining a mean impulse interference from the identified isolated impulse interferences; and
identify a plurality of impulses within a data block, match the interference impulse model to the identified impulses on the basis of amplitude, position in time, and phase of the identified impulses and subtract a scaled impulse model from the data block for each identified impulse.

15. The non-transitory machine-readable medium of claim 14, upon which instructions are stored, the instructions when executed by the processor, cause the processor to further:
apply a taper filter to the mean of the interference impulses to produce an impulse envelope wherein the envelope smoothly drops to zero at first and last samples of the mean to provide a baseline impulse model;
select a data block containing a predetermined number of samples of a received signal;
identify a largest amplitude impulse from the data block and extracting a number of digital samples before and after a peak sample of the largest amplitude impulse;
align the interference impulse model with the extracted samples and determine a scale factor and shift factor that produces a minimum least mean squares error;
apply the scale factor and shift factor to the interference impulse model and subtract the scaled model from the data block; and repeat the selecting, identifying, aligning and applying steps for each subsequent data block in the received signal.

\* \* \* \* \*